US 6,650,647 B1

(12) United States Patent
Ishikawa et al.

(10) Patent No.: US 6,650,647 B1
(45) Date of Patent: Nov. 18, 2003

(54) SYSTEMS, APPARATUS AND METHODS FOR DATA DISTRIBUTION AND DISPLAY

(75) Inventors: Katsuya Ishikawa, Zama (JP); Makoto Nishino, Yokohama (JP); Miki Takaoka, Kawasaki (JP); Takeshi Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/391,334

(22) Filed: Sep. 7, 1999

(30) Foreign Application Priority Data

Sep. 11, 1998 (JP) ............................................. 10-258859

(51) Int. Cl.[7] .............................................. H04L 12/28
(52) U.S. Cl. ....................................... 370/400; 709/203
(58) Field of Search ................................. 370/400, 401, 370/352, 353, 310, 316, 328, 395.1, 395.52, 351, 389, 396, 408; 455/456; 701/213, 207, 208; 709/201, 203

(56) References Cited

U.S. PATENT DOCUMENTS

| 6,138,072 A | * | 10/2000 | Nagai ........................... 701/207 |
| 6,169,515 B1 | * | 1/2001 | Mannings et al. ........ 342/357.1 |
| 6,240,360 B1 | * | 5/2001 | Phelan ........................ 701/208 |
| 6,246,958 B1 | * | 6/2001 | Hirono ........................ 701/208 |
| 6,263,343 B1 | * | 7/2001 | Hirono ...................... 707/104.1 |
| 6,349,203 B1 | * | 2/2002 | Asaoka et al. ............... 455/414 |

FOREIGN PATENT DOCUMENTS

| JP | 8-315292 A | 11/1996 |
| JP | 09-258944 | 10/1997 |
| JP | 10-207352 A | 8/1998 |
| JP | 10-227645 A | 8/1998 |

* cited by examiner

Primary Examiner—Douglas Olms
Assistant Examiner—Brian Nguyen
(74) Attorney, Agent, or Firm—Thu Ann Dang

(57) ABSTRACT

A service node operates as a dispatch service apparatus. A client node operates as a car navigation apparatus loaded in a vehicle such as a taxi or a delivery truck. In response to a request from the service node, a Web server distributes to the requesting service node via a communication network, position data including the latitude and longitude of the address or location (destination) of an individual or a corporation. The service node distributes to the client node via the communication network, the position data obtained from the Web server, and the client node shows the driver a route from the current position of the client node to a destination by displaying it on a map. Accordingly, the invention effectively combines browser software and mail communication together to simply and efficiently distribute information obtained from a Web server via the Internet.

21 Claims, 7 Drawing Sheets

*FIG. 7*

```
Date:Tue,23 Jul 1998 20:20:13 +0900
From:<Ishikawa@da.airnet.ne.jp>
Message-id:<199807231120UAA14014@mail.da.airnet.ne.jp>
To:<Ishikawa@yamato.ibm.co.jp>
Subject:[none]
MIME:Version: 1.0
Content-Transfer-Encoding: 7bit
Content-Type: multipart/mixed;
   boundary="-----QMzRhIAJOETBKWLtztvIEMhpFYBPsWajccVjofj"
Status:RO This is a multi-part message in MIME format
-------QMzRhIAJOETBKWLtztvIEMhpFYBPsWajccVjofj
```

HUMAN READABLE MESSAGE SECTION:
```
Content-Type:text/plain; charset=us-ascii
Content-Transfer-Encoding: 7bit Human readable messagees.
```

```
-------QMzRhIAJOETBKWLtztvIEMhpFYBPsWajccVjofj
```

ATTACHED POSITION DATA SECTION:
```
Content-Type: application/x-loc
Content-Transfer-Encoding: base64
Content-Disposition: attachment; filename="position_info_file.loc"
```

ENCODED AND ATTACHED POSITION DATA:
```
bmFtZT2L2pHyjPaJgApwb3NpdGlvbi1sYXRpdHVkZT00MjU4MDIyCnBvc210aW9uLWxvbm
dpdHVkZT0zMTU0MTAwCg
```

```
-------QMzRhIAJOETBKWLtztvIEMhpFYBPsWajccVjofj
```

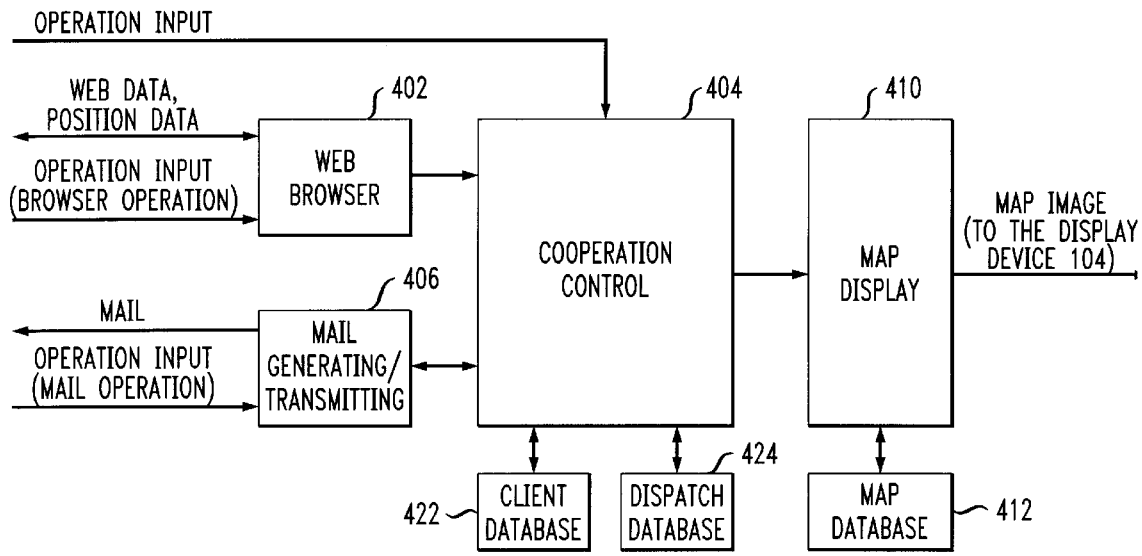
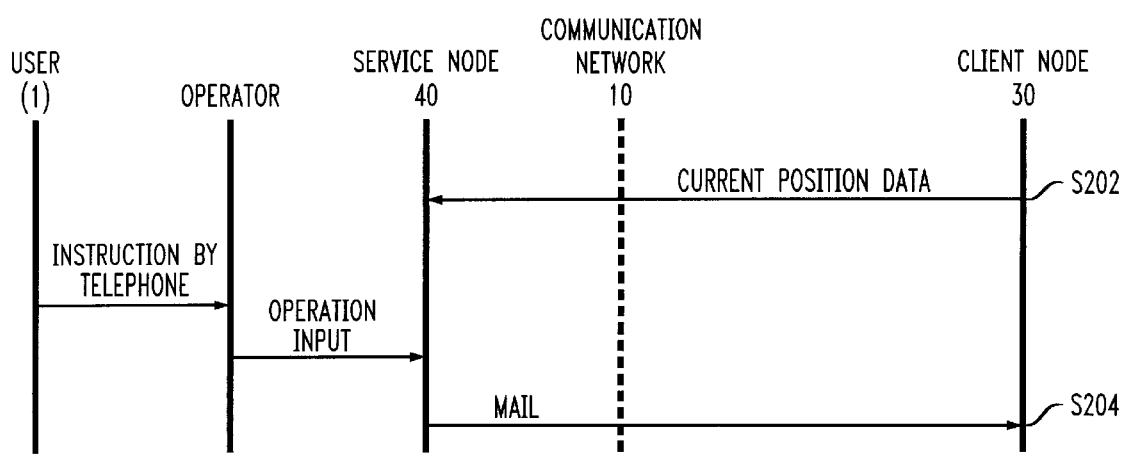

SYSTEMS, APPARATUS AND METHODS FOR DATA DISTRIBUTION AND DISPLAY

FIELD OF THE INVENTION

The present invention relates to a data distribution systems, apparatus and methods for obtaining data from a Web server via wire and/or radio communication networks to distribute mail including this data to client nodes via the wire and/or radio communication networks. Specifically, the present invention relates to data distribution systems, apparatus and methods preferably used to obtain from a Web server position information on the location of a client to communicate this information to a client node, to display in the client node, the position information on the location of the client, and to further display a route to the location of the client.

BACKGROUND OF THE INVENTION

Browser software such as "Internet Explorer" from Microsoft Corp. and "Netscape Navigator" from Netscape Communications Corporation is now commonly used such that requested data is distributed from a World Wide Web (WWW) server (also referred to as a Web server) via the Internet and the received data is displayed in accordance with the browser software.

Mail communication is also commonly used now, including not only mail communication between computers connected to a wire communication network but also mail communications between computers connected to both wire and radio communication networks, respectively, and between portable computers connected to a radio communication network. However, methods for effectively combining these communication methods to efficiently distribute data are not well known.

In addition, car navigation systems using GPS (Global Positioning System) technology are now widely used. For example, installing a car navigation apparatus in a taxi and allowing the apparatus to display a route to the location (destination) of a client who has hired the taxi, the taxi can reach the location of the client without deviating from the correct course.

However, to allow the car navigation apparatus installed in the taxi to display the route to the destination, for example, the driver of the taxi must find in a map the destination communicated to the driver through radio communication and input the latitude and longitude to the car navigation apparatus.

In addition, for example, even if a taxi dispatch center can obtain position information on the latitude and longitude of the destination via the Internet by means of retrieval from a Web server, an operator must orally inform the taxi driver of the retrieved position information on the destination via a radio transmitter and the driver must manually input to the car navigation apparatus the position information on the destination obtained through the driver's radio.

These operations require a large amount of time and labor and cannot be performed while driving due to the need to turn the eyes from the front view in order to check the map. In addition, input errors are likely to occur in inputting orally communicated position information to the car navigation apparatus. Thus, it is difficult to inform a taxi driver of a route to a destination using a car navigation apparatus.

SUMMARY OF THE INVENTION

The present invention is provided in view of these problems of the background art, and its object is to provide a data distribution system, apparatus, and method capable of effectively combining browser software and mail communication together to simply and efficiently distribute information obtained from a Web server via the Internet, to users (client nodes) through mail communication.

Another object of this invention is to provide a data distribution system, apparatus, and method preferably used to effectively combine browser software, mail communication, and a car navigation apparatus together to distribute information obtained from a Web server via the Internet, to the car navigation apparatus through mail communication so that the user displays a route to the destination without the need for complicated operations.

To achieve these and other objects, a data distribution system according to this invention includes one or more data servers, service nodes, and client nodes, each of the data servers responsive to a request from one of the service nodes for transmitting to the requesting service node, index data indicating one or more distributing data that can be distributed to one of the other communication nodes and the distributing data indicated by the index data, each of the service nodes comprising a requesting/receiving means for requesting the data server to transmit the index data and the distributing data and receiving the index and distributing data transmitted in response to the request for transmission, and mail generating/distributing means for generating mail including the received distributing data and distributing the generated mail to one or more of the client nodes.

Preferably, each of the data servers comprises HTML (HyperText Markup Language) data transmission means responsive to a request from one of the service nodes for transmitting to the requesting service node HTML data including links to one or more of the distributing data and used as the index data, and distributing data transmission means responsive to a request from one of the service nodes including a specification for the link to one of the distributing data, for transmitting the distributing data with its link specified to the requesting service node, and the requesting/receiving means of each of the service nodes requests one of the data servers to transmit the HTML data, receives the HTML data transmitted in response to the request, specifies the link to desired one of the distributing data included in the received HTML data, requests the data server transmitting the HTML data to transmit the desired distributing data, and receives the desired distributing data transmitted in response to the request.

Preferably, the distributing data is position data each indicating the position of a predetermined place. In each of the data servers, the HTML data transmission means transmits HTML data including links to one or more of the position data, and in response to a request including a specification for the link to one of the position data, transmits the position data with the link specified. In each of the service nodes, the requesting/receiving means specifies the link to desired one of the position data included in the HTML data in order to request the desired position data to be transmitted, and receives the desired position data transmitted in response to the request, and the mail generating/distributing means generates mail including the received distributing data and distributes the generated mail. Each of the client nodes comprises mail receiving means for receiving the transmitted mail, and a position display means functional based on the position data included in the received mail, for displaying the predetermined place indicated by this position data.

BRIEF DESCRIPTION OF THE DRAWINGS

FIG. 7 illustrates mail generated by the mail generating/transmitting section shown in FIG. 6 and transmitted to the client node;

FIG. 11 shows a configuration of a second dispatch service software used by the service node shown in FIGS. 1 and 3 in order to realize the functions as a dispatch service apparatus; and FIG. 12 shows a communication sequence (S200) indicating the position displaying operation according to a second embodiment.

DETAILED DESCRIPTION OF PREFERRED EMBODIMENTS

Figure 1:
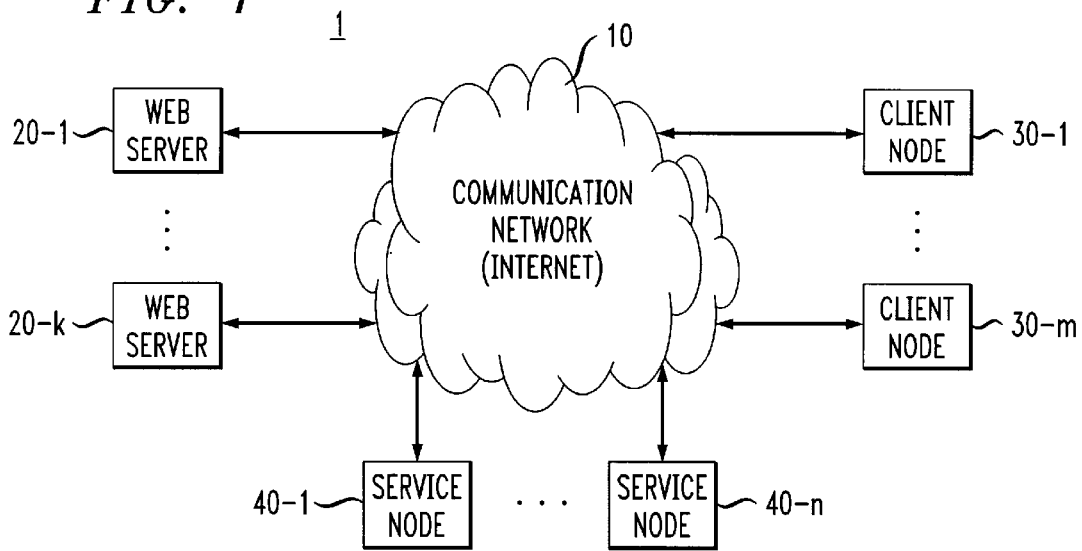
FIG. 1 shows a configuration of a communication network to which a data distribution method (a position displaying method) according to the present invention is applied.

A data distribution system according to the invention and its components will first be generally described followed by a description of various embodiments of the invention in the context of the figures. However, it is to be appreciated that the invention is not intended to be limited by any particular embodiment or application described herein.

Operation of the Data Distribution System

The data distribution system according to this invention is composed of, for example, one or more data servers, service nodes, and client nodes that transmit and receive data to and from one another via the Internet composed of radio and wire communication networks.

Data Server

The data server is, for example, a Web server. If a service node issues a request to the data server, the data server transmits to the requesting service node HTML data including one or more links to available distributing data and used as index data.

In addition, if a service node issues to the data server a request specifying a link to distributing data, the data server transmits to the requesting service node the distributing data indicated by this link in the form of, for example, text data.

To make the description understood easily, a specific example will be described below in which the data server is a Web server that, for example, provides position information (e.g., latitude and longitude) on the location and address of a corporation or an individual specified by another corporation or individual and in which the service node is a dispatch service apparatus for receiving position data from the Web server and distributing this data to a position displaying apparatus (a client node, for example, a car navigation apparatus) installed in a taxi or a delivery truck.

Data Transmission Between the Data Server and the Service Node

In this case, when the dispatch service apparatus (the service node) requests the Web server (the data server) to transmit HTML data (index data) that displays an image in which the location and address of the corporation or individual is associated with the link to the position data indicating the relevant latitude and longitude, then the Web server (the data server) transmits, in response to the request, this HTML data (index data) to the requesting dispatch service apparatus (the service node).

The dispatch service apparatus (the service node) displays the HTML data to an operator and the operator selects one of the individuals and corporations (links) included in the displayed HTML data using mouse clicks, or the dispatch service apparatus automatically selects one of the links included in the HTML data according to predetermined rules. When position data to be requested from the Web server is selected in this manner, the dispatch service apparatus (the service node) transmits to the Web server (the data server) a request for transmission of the position data (distributing data) including a specification for the link to the selected position data.

In response to the request from the dispatch service apparatus (the service node), the Web server (the data server) transmits to the requesting dispatch service apparatus (the service node) the position data (distributing data) indicated by the link specified in the request. The dispatch service apparatus receives this position data (distributing data).

HTML Data Transmission Means

In the Web server (the data server), in response to the request from the dispatch service apparatus (the service node), the HTML data transmission means returns HTML data including the link to the position data (distributing data), to the requesting dispatch service apparatus (the service node) via the Internet, as described above.

Distributing Data Transmission Means

When the dispatch service apparatus (the service node) makes a request including a specification for the link to the position data (distributing data) included in the HTML data, a distributing data transmission means returns to the requesting dispatch service apparatus (the service node) via the Internet, the position data (distributing data) including the latitude and longitude of the address or location of the specified individual or corporation, as described above.

Index/Distributing Data Requesting/Receiving Means

In the dispatch service apparatus (the service node), an index/distributing data requesting/receiving means requests the Web server (the data server) to transmit HTML data and receives the HTML data returned via the Internet in response to this request, as described above.

In addition, as described above, the index/distribution data requesting/receiving means also selects desired one of the links to the position data (distributing data) on the individuals and corporations included in the received HTML, wherein the link is selected, for example, according to the operator's operations or automatically according to predetermined rules. The index/distributing data requesting/receiving means then issues to the Web server (the data server) a request for transmission of the position data including a specification for the selected link, and receives the position data (distributing data) returned via the Internet in response to this request.

Mail Generating and Transmitting Means

According to the operator's operations or automatically, mail generating and transmitting means generates mail including the position data (distributing data) received from the Web server and including the latitude and longitude of the address or location of the desired individual or corporation, and transmits the mail to the car navigation apparatus (the client node) on the taxi or delivery truck via the Internet using a radio communication line.

Client Node

The car navigation apparatus (the client node) displays a map showing the neighborhood of the latitude and longitude included in the position data (distributing data) received from the dispatch service apparatus (the service node), and also displays within the map the address and location of the individual or corporation indicated by the position data.

The car navigation apparatus (the client node) further uses road information included in map data used to display the map to display within the map the current position measured by a GPS apparatus and a route between the current position and the address and location of the individual or corporation indicated by the position data.

Data Distribution Apparatus

In addition, data distributing apparatus according to this invention includes data distributing apparatus for distributing to one or more client nodes data obtained from one of one or more data servers, each of the data servers responsive to a request from the data distributing apparatus for transmitting to the requesting data distributing apparatus, index data indicating one or more distributing data that can be distributed to one of the other communication nodes and the distributing data indicated by the index data, the data distributing apparatus comprising requesting/receiving means for requesting the data server to transmit the index data and the distributing data and receiving the index and distributing data transmitted in response to the request for transmission, and mail generating/distributing means for generating mail including the received distributing data and distributing the generated mail to one or more of the client nodes.

Preferably, each of the data servers transmits, in response to a request from one of the distributing apparatuses, HTML data including links to one or more of the distributing data, to the requesting service node as the index data, and in response to a request from one of the data distributing apparatuses including a specification for the link to one of the distributing data, transmits the distributing data with its link specified to the requesting data distributing apparatus, and the requesting/receiving means of each of the data distributing apparatuses requests one of the data servers to transmit the HTML data, receives the HTML data transmitted in response to the request, specifies the link to desired one of the distributing data included in the received HTML data, requests the data server transmitting the HTML data to transmit the desired distributing data, and receives the desired distributing data transmitted in response to the request.

Preferably, the distributing data is position data each indicating the position of a predetermined place, and each of the data servers transmits HTML data including links to one or more of the position data, and in response to a request including a specification for the link to one of the position data, transmits the position data with the link specified. In each of the service nodes, the requesting/receiving means specifies the link to desired one of the position data included in the HTML data in order to request the desired position data to be transmitted, and receives the desired position data transmitted in response to the request, and the mail generating/distributing means generates mail including the received distributing data and distributes the generated mail.

In addition, a position displaying apparatus according to the present invention includes a position displaying apparatus for receiving from one of one or more data servers position data each indicating a predetermined place and displaying the place indicated by each of the received position data, each of the data servers responsive to a request from one of the service nodes for transmitting to the requesting service node HTML data that can be distributed to the other communication nodes and that includes links to one or more of the position data, each of the service nodes requesting the data server to transmit the HTML data and the position data, receiving the HTML and position data transmitted in response to the request for transmission, generating mail including the received position data, and distributing the generated mail to one or more of the position displaying apparatuses, the position displaying apparatus comprising mail receiving means for receiving the transmitted mail, and position displaying means functional based on the position data included in the received mail, for displaying the predetermined place indicated by this position data.

Preferably, the position data each include latitude and longitude data indicating the latitude and longitude of a place corresponding to each of the position data, and the position displaying means displays the place indicated by the latitude and longitude data included in the received mail so that the place is associated with map data.

Preferably, the map data includes road data indicating roads and the position displaying apparatus further comprises a position measuring means for measuring the position of the position displaying apparatus. Based on the measured position of the position displaying apparatus and the road data, the position displaying means further displays a road path joining the position of the position displaying apparatus and the place indicated by the latitude and longitude.

Data Distributing Method

In addition, a data distribution system according to the present invention includes one or more data servers, service nodes, and client nodes, each of the data servers responsive to a request from one of the service nodes for transmitting to the requesting service node, index data indicating one or more distributing data that can be distributed to one of the other communication nodes and the distributing data indicated by the index data, each of the service nodes requesting the data server to transmit the index data and the distributing data and receiving the index and distributing data transmitted in response to the request for transmission, and generating mail including the received distributing data and distributing the generated mail to one or more of the client nodes.

Recording Medium

In a data distributing apparatus for distributing to one or more client nodes data obtained from one of one or more data servers, each of the data servers responsive to a request from the data distributing apparatus for transmitting to the requesting data distributing apparatus, index data indicating one or more distributing data that can be distributed to one of the other communication nodes and the distributing data indicated by the index data, a first recording medium according to this invention allows a computer to execute a requesting/receiving step for requesting the data server to transmit the index data and the distributing data and receiving the index and distributing data transmitted in response to the request for transmission, and a mail generating/distributing step for generating mail including the received distributing data and distributing the generated mail to one or more of the client nodes.

In a position displaying apparatus for receiving from one of one or more data servers position data each indicating a predetermined place and displaying the place indicated by each of the received position data, each of the data servers responsive to a request from one of the service nodes for transmitting to the requesting service node HTML data that can be distributed to the other communication nodes and that includes links to one or more of the position data, each of the service nodes requesting the data server to transmit the HTML data and the position data, receiving the HTML and position data transmitted in response to the request for transmission, generating mail including the received position data, and distributing the generated mail to one or more of the position displaying apparatuses, a second recording medium according to the present invention allows a computer to execute a mail receiving step for receiving the transmitted mail, and a position displaying step functional based on the position data included in the received mail, for displaying the predetermined place indicated by this position data.

First Embodiment

A first embodiment of the present invention will be described below.

FIG. 1 shows a configuration of a communication network 1 to which a data distribution method (a position displaying method) according to the present invention is applied.

As shown in FIG. 1, the communication network 1 is composed of a plurality of communication nodes, that is, (k) Web servers 20-1 to 20-k, (m) client nodes 30-1 to 30-m, and (n) service nodes 40-1 to 40-n (k, m, n=1, 2, 3, . . . ) that are all connected to a communication network 10 such as the Internet via wire or radio communication lines. If any one of the plurality of components such as the Web servers 20-1 to 20-k is indicated below without identification, it is simply described as, for example, the Web server 20.

Figure 2:
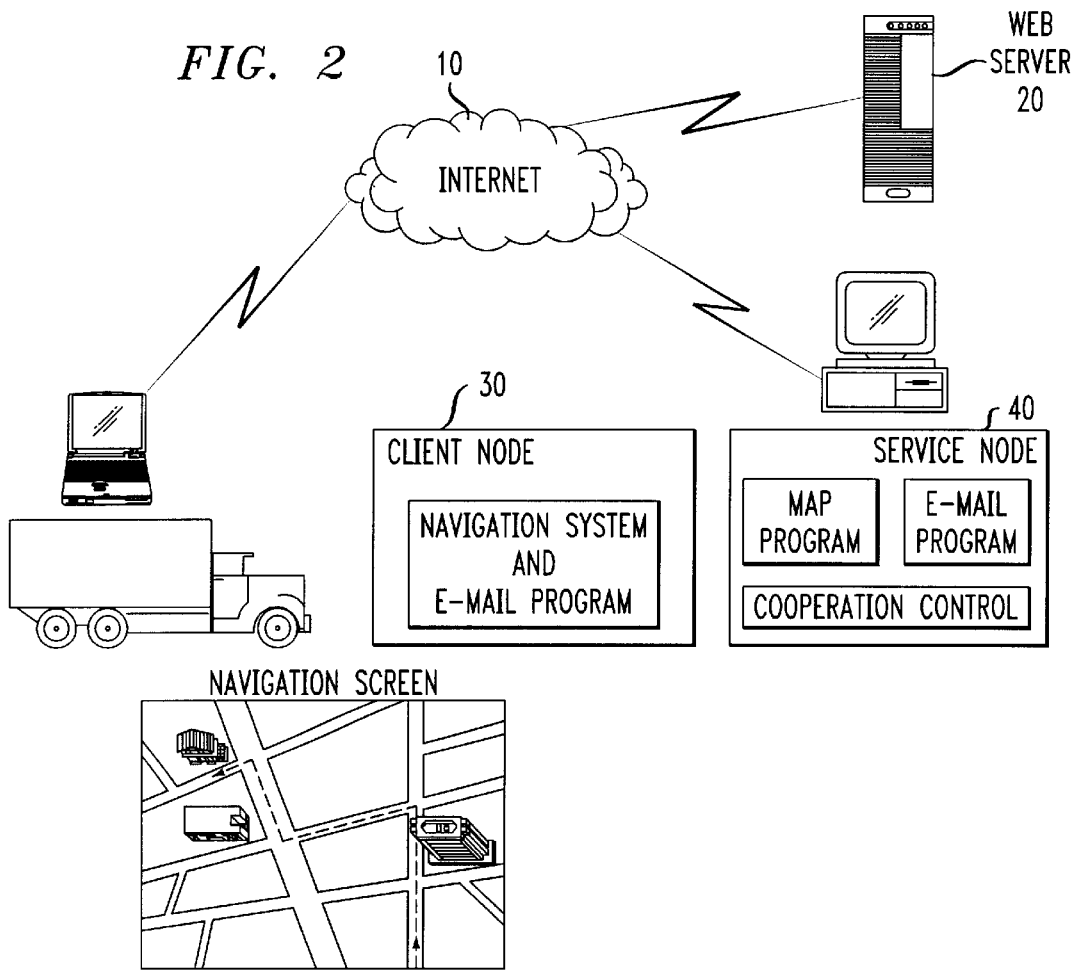
FIG. 2 illustrates a first position displaying method according to this invention that is implemented in the communication network 1 (FIG. 1)

FIG. 2 illustrates a first position-displaying method according to this invention that is implemented in the communication network 1 (FIG. 1).

A specific example is described below in which a service node operates as a dispatch service apparatus, in which a client node 30 operates as a car navigation apparatus loaded in a vehicle such as a taxi or a delivery truck, and in which in response to a request from the service node 40, position data including the latitude and longitude of the address or location (destination) of an individual or a corporation is distributed to the requesting service node 40 via the communication network 10, the service node then distributing the position data obtained from the Web server 20 to a client node 30 via the communication network 10, the client node 30 then showing the driver a route from the current position to the destination by displaying it on a map, as illustrated in FIG. 2.

Figure 3:
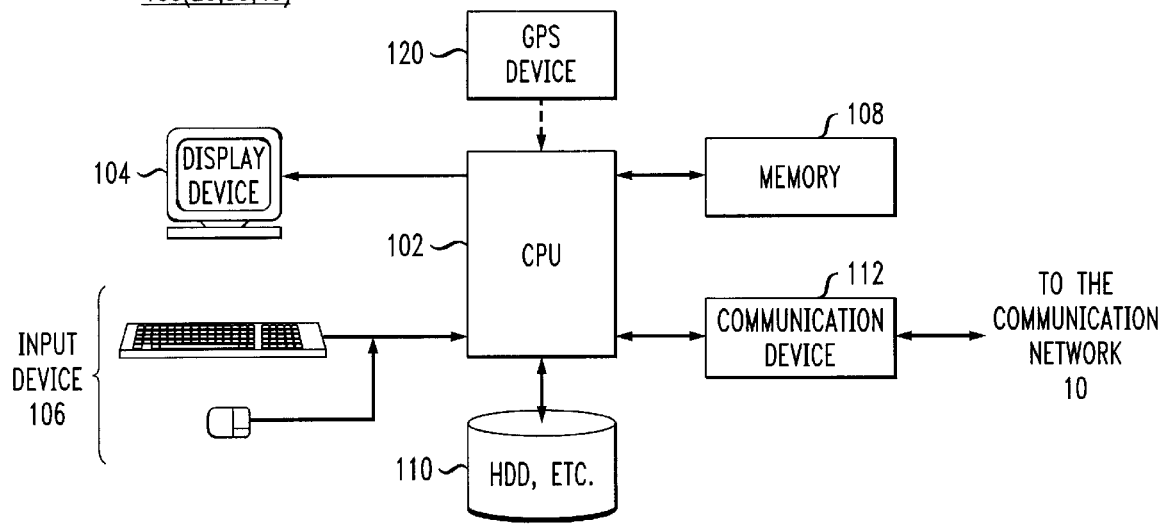
FIG. 3 illustrates a computer constituting each of the Web server, client node, and service node shown in FIG. 1.

FIG. 3 illustrates a computer 100 constituting each of the Web server 20, client node 30, and service node 40 shown in FIG. 1.

As shown in FIG. 3, the computer 100 is composed of a CPU 102 including a microprocessor and its peripheral circuits, a display device 104 such as a CRT display device, an input device 106 including a keyboard and a mouse, a memory 108, a recording device 110 such as a hard disc device (HDD) and a flexible disc device (FDD), and a communication device 112.

The computer 100 implements the functions of a normal computer using the CPU 102, the display device 104, the input device 106, the memory 108, and the recording device 110.

In addition, if the computer 100 operates as a car navigation apparatus in the client node 30, it additionally has a GPS device 120.

Communication Device 112

The communication device 112 transmits data between the CPU 102 and the communication network 10. The communication device 112 normally connects the CPU 102 and the communication network 10 together via a wire communication line, but if the client node 30 is used as a car navigation apparatus, the communication device 112 of the client node 30 connects the CPU 102 and the communication network 10 together via a radio communication line.

GPS Device 120

The GPS device 120 receives signals from an artificial satellite to measure the position of the client node 30 at each point of time. The GPS device 120 then generates current position data including information on the latitude and longitude of the position of the client node 30 at each point of time and outputs this data to the CPU 102.

Figure 4:
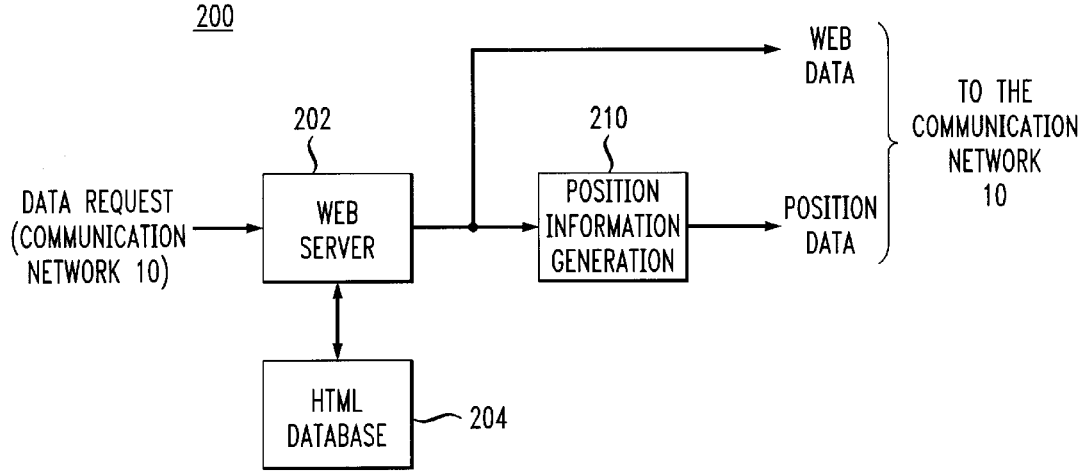
FIG. 4 shows a configuration of Web server software used by the Web server shown in FIGS. 1 and 3 in order to implement the functions as a Web server.

FIG. 4 shows a configuration of Web server software 200 used by the Web server 20 shown in FIGS. 1 and 3 in order to implement the functions as a Web server.

Figure 5:
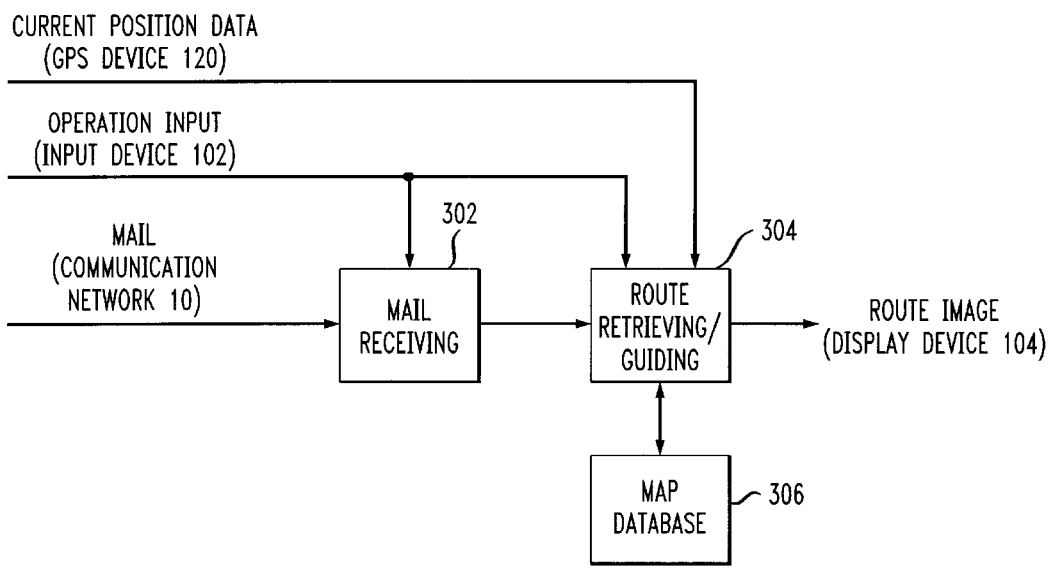
FIG. 5 shows a configuration of car navigation software used by the client node shown in FIGS. 1 and 3 in order to implement the functions as a car navigation apparatus.

FIG. 5 shows a configuration of car navigation software 300 used by the client node 30 shown in FIGS. 1 and 3 in order to implement the functions as a car navigation apparatus.

Figure 6:
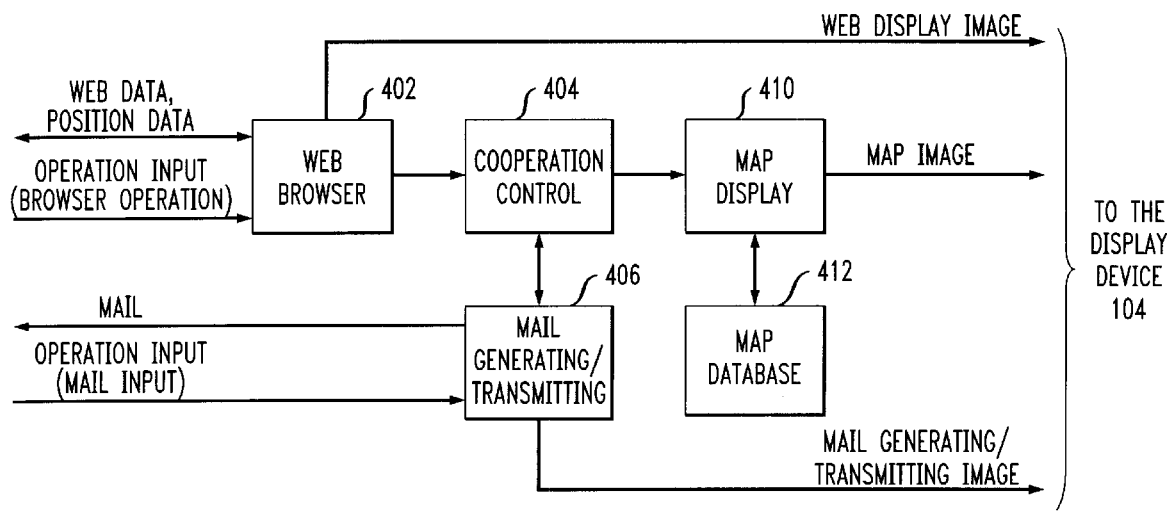
FIG. 6 shows a configuration of a first dispatch service software used by the service node shown in FIGS. 1 and 3 in order to implement the functions as a dispatch service apparatus.

FIG. 6 shows a configuration of dispatch service software 400 used by the service node 40 shown in FIGS. 1 and 3 in order to implement the functions as a dispatch service apparatus.

In the Web server recording device 110 of the computer 100 (FIG. 3) constituting each of the Web server 20, client node 30, and service node 40, the Web server software 200 shown in FIG. 4, the car navigation software 300 shown in FIG. 5, and the dispatch service software 400 shown in FIG. 6, respectively, are recorded on a recording medium such as a hard disc, loaded in the memory 108 from the recording device 110 upon activation, and executed therein.

Web Server 20

As described above, in response to a request from the service node 40, the Web server 20 transmits to the requesting service node 40 via the communication network 10, HTML data including the link to position data including the latitude and longitude of the address or location (destination) of an individual or a corporation.

In addition, in response to the request from the service node 40 specifying the link to the position data, the Web server 20 transmits the position data on the specified destination to the requesting service node 40 via the communication network 10, for example, in the form of text data, as shown in Table 1.

TABLE 1

Example of position data

| | |
|---|---|
| Latitude = N35° 30' 08" | (indicating the latitude of the destination) |
| Longitude = E139° 27' 21" | (indicating the longitude of the destination) |
| Name = Japan IBM | (indicating the name of the destination) |
| Classification = Company | (indicating that the destination is a company (a corporation)) |
| Time = 9:00 to 17:00 | (indicating the period of time (operation time) during which the destination is open) |

Web Server Software 200

As shown in FIG. 4, the Web server software 200 is composed of a Web server section 202, an HTML database section 204, and a position information generation section 206.

HTML Database Section 204:

In the Web server software 200 (FIG. 4), the HTML database (DB) 204 records thereon HTML data transmitted to the service node 40, and according to control from the Web server section 202, reads out the requested HTML data and outputs it to the Web server section 202.

Web Server Section 202:

The Web server section 202 receives a request from the service node 40 and controls the database section 204 and the position information generation section 206.

In response to a request from the service node 40, the Web server section 202 reads out from an HTML database section 204 HTML data including the link to position data, and transmits the read-out HTML data to the requesting service node 40 via the communication device 112 (FIG. 3) and communication network 10 (FIG. 1).

Position Information Generation Section 206:

The position information generation section 206 stores position data (Table 1), and according to control from the Web server section 202, and transmits to the requesting service node 40 the position data indicated by the link included in the request from the service node 40.

Client Node 30

As described above, based on the position information on the destination received from the service node 40, the client node 30 displays on the display device 104 a map showing the periphery of the destination and further shows a route between the client node 30 and the destination using, for example, a dotted line.

That is, the client node 30 has functions as a car navigation apparatus, and further has the function of using the position information obtained from the service node 40 to automatically display a route from the vehicle with the client node 30 to the destination.

Car Navigation Software 300

As shown in FIG. 5, the car navigation software is composed of a mail receiving section 302, a route retrieving/guiding section 304, and a map database section 306.

Mail Receiving Section 302:

In the car navigation software 300 (FIG. 5), the mail receiving section 302 receives mail transmitted from the service node 40 via the communication network 10, obtains the position data (Table 1) from the mail, and outputs it to the route retrieving/guiding section 304.

Map Database Section 306:

The map database section 306 is used in a car navigation apparatus and records thereon map data including road information, and according to control from the route retrieving/guiding section 304, reads out the recorded map data and output it to the route retrieving/guiding section 304.

Route Retrieving/Guiding Section 304:

Based on the current position data input from the GPS device 120 (FIG. 3) and indicating the latitude and longitude of the position of the client node 30 at each point of time and the position data on the destination input from the mail receiving section 302, the route retrieving/guiding section 304 reads out from the map database section 306 the map showing the periphery of the destination and displays the map on the display device 104.

In addition, the route retrieving/guiding section 304 further displays on the displayed map the position of the destination and the position of the client node 30 at each point of time.

In addition, using the road information in the map data input from the map database section 306, the route retrieving/guiding section 304 displays the position of the client node 30 at each point of time and a route between this position and the destination using a dot line.

Service Node 40

As described above, the service node 40 requests the Web server 20 to provide destination data including the latitude and longitude of the destination and distributes to the client node 30 via the communication network 10, the position data returned in response to this request.

Dispatch Service Software 400

As shown in FIG. 6, the dispatch service software 400 is composed of a Web browser section 402, a cooperation control section 404, a mail generating/transmitting section 406, a Web display section 410, and a map database section 412.

Web Browser Section 402:

In the dispatch service software 400 (FIG. 6), in response to an operation by the user (the operator) at the service node 40, the Web browser section 402 requests, via the communication network 10, the Web server 20 to transmit HTML data. The Web browser section 402 receives the HTML data returned from the Web server 20 via the communication network 10 in response to the request, and displays the received HTML data on the display device 104 as a Web display image.

In addition, in response to an operation performed by the operator on the Web display image displayed on the display device 104, or according to predetermined rules, the Web browser section 402 selects the link to the position data included in the received HTML data, specifies the selected link, and requests the Web server 20 to transmit the position data. The Web browser section 402 receives the position data returned from the Web server 20 via the communication network 10 in response to the request, and outputs the received position data to the cooperation control section 404.

Cooperation Control Section 404:

The cooperation control section 404 outputs to the mail generating/transmitting section and the map display section 410, the position data input from the Web browser section 402. The cooperation control section 404 also controls the operation of the map display section 410 and mail generating/transmitting section 406.

Mail Generating/Transmitting Section 406:

FIG. 7 illustrates mail generated by the mail generating/transmitting section 406 shown in FIG. 6 and transmitted to the client node 30. The mail generating/transmitting section 406 operates according to control from the cooperation control section 404 and an operation performed by the user (the operator) to generate mail, preferably, in the MIME Multipart format including a message that can be read by human beings, position data in the form of text, and coded position data. The mail generating/transmitting section 406 then transmits the mail via the communication network 10 to the client node 30 selected by the operator or automatically selected according to predetermined rules.

Map Database Section 412:

As in the map database section 306 (FIG. 5) in the client node 30, the map database section 412 records map data thereon, and according to control from the map display section 410, reads out the recorded map data and output it to the map display section 410.

Map Display Section 410:

The map display section 410 controls the map database section 412 to read out map data on the periphery of the destination indicated by the position data input from the cooperation control section 404, and displays the read-out map data on the display device 104.

Position Displaying Operation According to the First Embodiment

Furthermore, a position displaying operation according to the first embodiment will be described below with reference to FIGS. 8 and 9.

Figure 8:
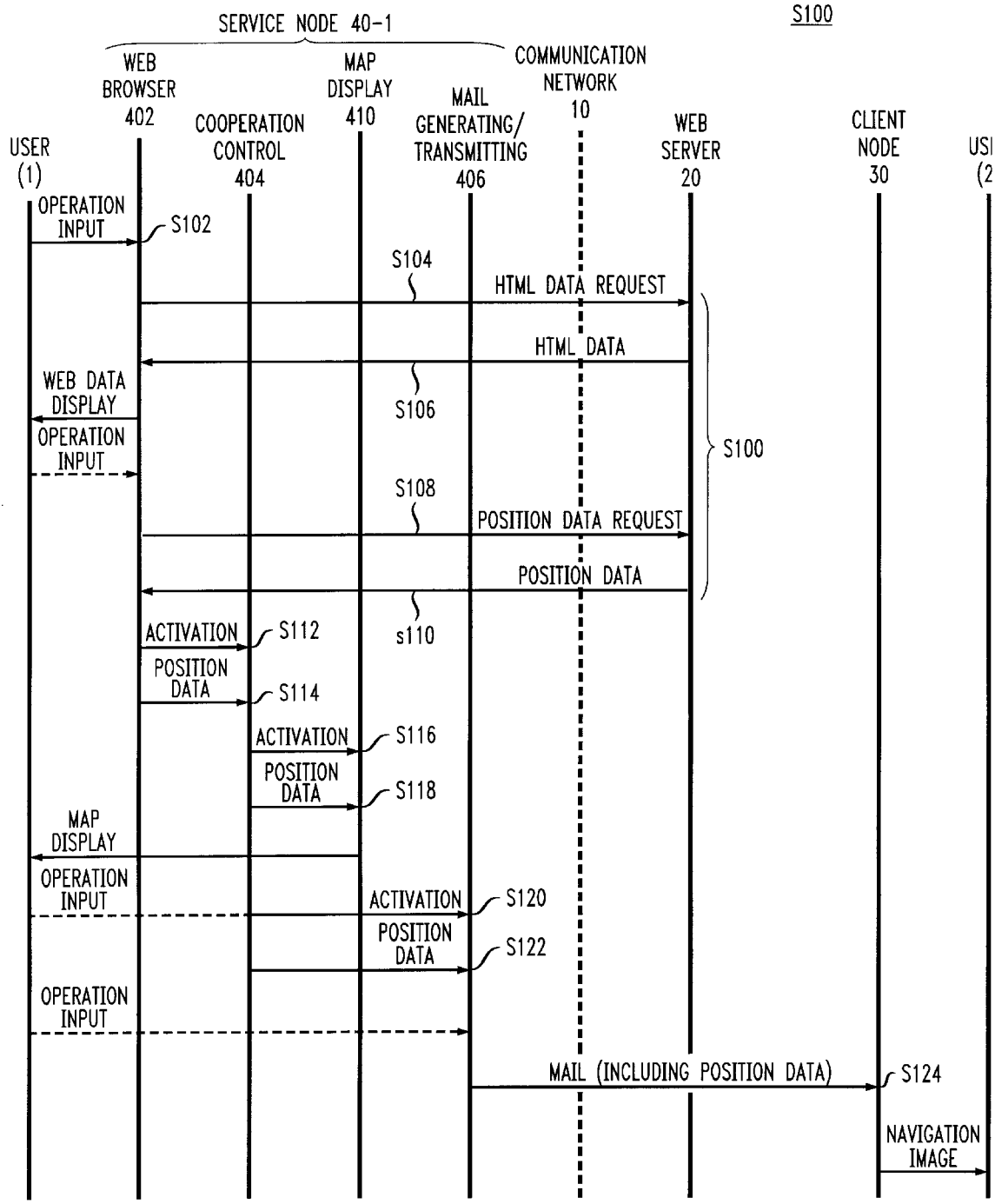
FIG. 8 shows a communication sequence (S100) indicating the position displaying operation according to a first embodiment.

FIG. 8 shows a communication sequence (S100) indicating the position displaying operation according to the first embodiment.

As shown in FIG. 8, in a sequence 102 (S102), the user (the operator) at the service node 40, for example, receives a request from a client, and performs on the Web browser section 402 an operation for requesting HTML data including position data on a destination to which a taxi or a delivery truck with the client node 30 loaded therein will be dispatched.

In a sequence 104 (S104), the Web browser 402 requests, via the communication network 10, the Web server 20 to transmit HTML data including the link to the position data on the destination.

In response to this request, the Web server 20 returns the HTMl data to the service node 40.

In a sequence 106 (S106), the Web server 20 returns the requested HTML data to the Web browser section 402 via the network 10.

Furthermore, the Web browser section 402 shows the user (the operator) the returned HTML data by displaying it on the display device 104.

In a sequence 108 (S108), when, for example, the user uses the mouse of the input device 106 to click the link to the position data on the destination included in the HTML data displayed on the display device 104, the Web browser section 402 issues to the Web server 20 a request for the transmission of the position data including a specification for the selected link.

In response to this request, the Web server 20 returns to the service node 40 the position data indicated by the selected link.

In a sequence 110 (S110), the Web browser section 402 receives the position data on the destination returned from the Web server 20.

In a sequence 112 (S112), the Web browser section 402 activates the cooperation control section 404.

In a sequence 114 (S114), the Web browser section 402 outputs to the cooperation control section 404 the position data on the destination returned from the Web server 20.

In a sequence 116 (S116), the cooperation control section 404 activates the map display section 410.

In a sequence 118 (S118), the cooperation control section 404 outputs the position data on the destination to the map display section 410.

Using the position data input from the cooperation control section 404, the map display section 410 allows the map database section 412 to retrieve map data on a predetermined range around the destination and shows the user (the operator) the map data obtained by the retrieval by displaying it on the display device 104 so that the user (the operator) can check the data.

In a sequence 120 (S120), the cooperation control section 404 activates the mail generating/transmitting section 406 according to the user's operation or automatically.

In a sequence 122 (S122), the cooperation control section 404 outputs the position data to the mail generating/transmitting section 406.

Figure 9:
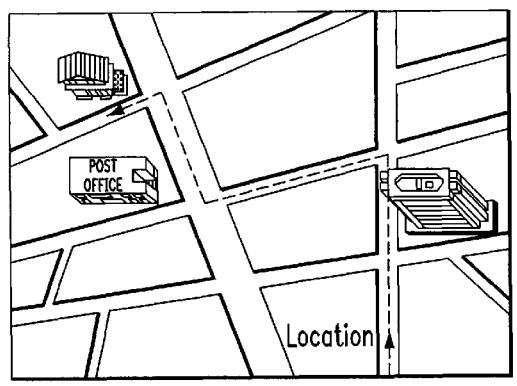
FIG. 9 illustrates a navigation image displayed on the display device by the client node shown in FIGS. 1 and 2.

FIG. 9 illustrates a navigation image displayed on the display device 104 by the client node 30 shown in FIGS. 1 and 2.

In a sequence 124 (S124), according to the operation performed by the user (the operator), the mail generating/transmitting section 406 generates a mail including the position data and transmits it to the client node 30.

Upon receiving the mail from the service node 40, the client node 30 displays on the display device 104 the map data on the periphery of the destination indicated by the position data included in the mail, and additionally shows the user (the driver) the position of the client node 30 at each point of time and an image indicating a route between this position and the destination and shown by a dotted line.

The first embodiment has been described in conjunction with the specific example in which the service node 40 receives the position data from the Web server 20 and then distributes to the client node 30 the mail including the received position data. However, the distributing data transmitted between these communication nodes and distributed to the client node 30 is not limited to the position data but may be other data, for example, data on commodity prices.

In addition, the first embodiment has been described in conjunction with the specific example in which the position data is distributed to the client node 30 so that the route between the destination and the client node 30 is displayed to the user (the driver). The applications of the data distribution method according to this invention are not limited to such position display, and this method can be widely applied to the distribution of data using Web servers, for example, the distribution to the client node 30 of data on commodity or exchange markets that is obtained from exclusive Web servers.

Second Embodiment

A second embodiment of the present invention will be described below.

Figure 10:
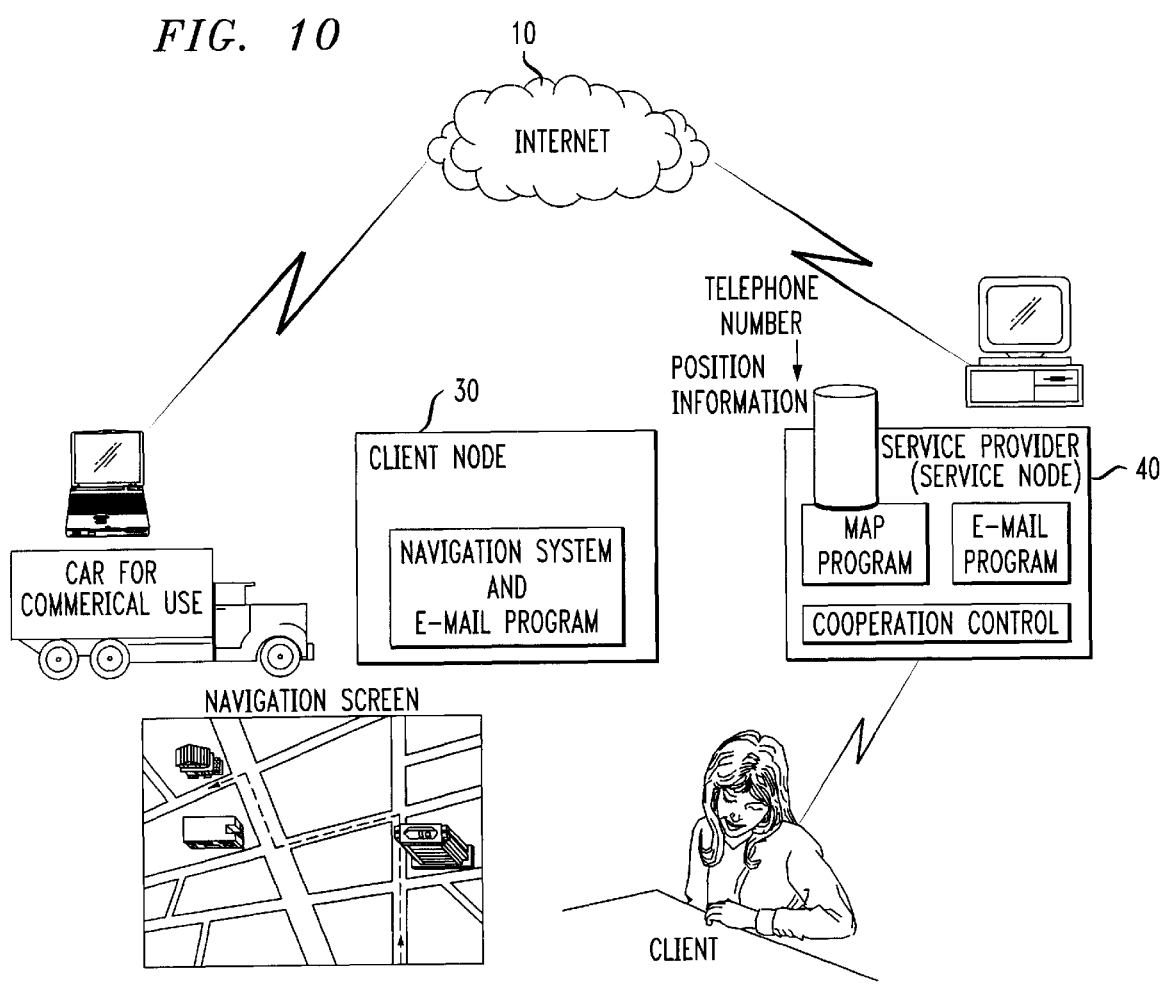
FIG. 10 shows a second position displaying method according to the present invention implemented in the communication network 1 (FIG. 1)

FIG. 10 shows a second position displaying method according to the present invention implemented in the communication network 1 (FIG. 1)

The second embodiment, that is, a data distribution method (a position displaying method) will be described in which without using the Web server 20, the service node 40 retrieves position data on a destination and a taxi or delivery truck suitable for the destination and in which the service node 40 then distributes the position data obtained by the retrieval to the client node 30 in the taxi or delivery truck obtained by the retrieval so that the position is displayed on the client node, as shown in FIG. 10.

The operations of each component of the communication network 1 according to the second embodiment are similar to those in the first embodiment unless otherwise specified.

FIG. 11 shows a configuration of the dispatch service software 420 used by the service node 40 shown in FIGS. 1 and 3 in order to realize the functions as a dispatch service apparatus.

As shown in FIG. 11, the dispatch service software 420 is composed of the dispatch service software 400 (FIG. 6) as well as a client database (DB) 422 and a dispatch database section 424.

Client Node 30

According to the second embodiment, the car navigation software 300 (FIG. 5) of the client node 30 (FIGS. 1 and 2) have its operation changed periodically or according to palling from the service node 40 so as to transmit to the service node 40 mail including the current position data measured by the GPS device 120.

Mail Generating/Transmitting Section 406:

According to the second embodiment, the mail generating/transmitting section 406 not only generates mail including position data and transmits it to the client node 30 as in the first embodiment, but also receives from the client node 30 mail including the current position data and then separates the current position data from the received mail to output it to the cooperation control section 404.

Cooperation Control Section 404:

According to the second embodiment, in addition to processing similar to that in the first embodiment, the cooperation control section 404 controls the client database section 422 and the dispatch database section 424 according to an operation performed by the user (the operator).

The cooperation control section 404 also outputs to the dispatch database section 424 the current position data on the client node 30 input from the mail generating/ transmitting section 406, while outputting to the mail generating/transmitting section 406 a mail address input from the dispatch database section 424.

Client Database Section 422:

The client database section 422 records and manages position data on clients using the service node 40, and according to control from the cooperation control section 404, reads out position data on a requested client and outputs it to the cooperation control section 404.

Dispatch Database Section 424:

The dispatch database section 424 associates the mail address of the client node 30 in each taxi or delivery truck with the current position data on each client node 30 input from the cooperation control section 404, and records and manages these data therein. According to control from the cooperation control section 404, section 424 retrieves the taxi or delivery truck located closest to the position data on the client input from the cooperation control section 404 which outputs to the mail generating/transmitting section 406 the mail address of the taxi or delivery truck found by the retrieval.

Position Displaying Operation According to the Second Embodiment

Furthermore, a position displaying operation according to the second embodiment will be described below with reference to FIG. 12.

FIG. 12 shows a communication sequence (S200) indicating the position displaying operation according to the second embodiment.

As shown in FIG. 12, in a sequence 202 (S202), the client node 30 transmits mail including the current position data.

The mail generating/transmitting section 406 of the Web server 20 receives the current position data from the client node 30, and outputs to the dispatch database section 424 the current position data included in the received mail.

The dispatch database section 424 associates the input current position data with the mail address of the client node 30 from which the current position data has been transmitted, and records and manages these data therein.

When a user (a client) gives an instruction to the user (the operator) at the service node 40 by telephone, the user (the operator) at the service node 40 inputs to the cooperation control section 404 information identifying the client.

In a sequence 204 (S204), the cooperation control section 404 controls the client database section 422 to retrieve position data on the client identified by the information input by the user (the operator) in order to obtain the position data on the client.

The cooperation control section 404 outputs the client's position data obtained to the dispatch database section 424 and allows the section 424 to retrieve the client node 30 located closest to the location of the client in order to obtain the mail address of the client node 30 obtained by the retrieval.

The cooperation control section 404 outputs to the mail generating/transmitting section 406 the client's position data obtained and the mail address of the client node 30 located closest to the location of the client.

In a sequence 206 (S206), the mail generating/ transmitting section 406 uses as a destination the mail address input from the cooperation control section 404 to generate mail including the client's position data input from the cooperation control section 404. The mail generating/ transmitting section 406 then transmits the mail to the client node 30 located closest to the client.

The client node 30 that has received this mail displays a map showing the periphery of the client and also displays on the map a dotted line indicating a route between the location of the client and the position of the client node 30 at each point of time.

Advantages Of The Invention

As described above, according to the data distribution system, apparatus, and method in accordance with this invention, the browser software and mail communication can be effectively combined together to simply and efficiently distribute to the user (the client node) via the mail communication, information obtained from the Web server via the Internet.

In addition, according to the data distribution system, apparatus, and method in accordance with this invention, the browser software, mail communication, and car navigation apparatus can be effectively combined together to distribute to the car navigation apparatus via the mail communication, information obtained from the Web server via the Internet, in order to display to the user a route to the destination without requiring the user to perform complicated operations.

What is claimed is:

1. A system for distributing data, the system comprising:
   one or more data servers, service nodes, and client nodes coupled by at least one communication network;
   each of said data servers responsive to a request from one of said service nodes for transmitting to said requesting service node index data indicative of distributing data that can be distributed to other nodes and said distributing data; and
   each of said service nodes operative to: (i) request one of said data servers to transmit said index data and said distributing data, (ii) receive said index data and distributing data transmitted in response to the request for transmission, (iii) generate mail including said received distributing data, and (iv) distribute said generated mail to one or more of said client nodes.

2. The system of claim 1, wherein each of said data servers is operative to: (i) in response to the request from one of said service nodes, transmit to said requesting service node HTML data including one or more links to said distributing data, and (ii) in response to the request from one of said service nodes including a specification for the link to said distributing data, transmit said distributing data with its link specified to said requesting service node.

3. The system of claim 2, wherein each of said service nodes is operative to: (i) request one of said data servers to transmit said HTML data, (ii) receive said HTML data transmitted in response to the request, (iii) specify the link to desired one of said distributing data included in said received HTML data, (iv) request said data server transmitting said HTML data to transmit said desired distributing data, and (v) receive said desired distributing data transmitted in response to the request.

4. The system of claim 3 wherein said distributing data is position data indicative of a position of a predetermined place.

5. The system of claim 4, wherein each of said data servers is operative to: (i) transmit HTML data including links to one of said position data, and (ii) in response to a request including a specification for the link to one of said position data, transmit said position data with the link specified.

6. The system of claim 5, wherein each of said service nodes is operative to: (i) specify the link to desired one of said position data included in said HTML data in order to request said desired position data to be transmitted, (ii) receive said desired position data transmitted in response to the request, (iii) generate mail including said received distributing data, and (iv) distribute said generated mail.

7. The system of claim 6, wherein each of said client nodes is operative to: (i) receive said transmitted mail, (ii) display said predetermined place indicated by said position data included in said received mail.

8. Apparatus for distributing data obtained from one of one or more data servers to one or more client nodes, the apparatus comprising:
   at least one processing device operative to: (i) request one of said data servers to transmit index data indicative of distributing data that can be distributed to other nodes and said distributing data indicated by said index data, (ii) receive said index data and said distributing data transmitted in response to the request for transmission, (iii) generate mail including said received distributing data, and (iv) distribute said generated mail to one or more of said client nodes.

9. The apparatus of claim 8, wherein each of said data servers transmits, in response to a request from one of a plurality of distributing apparatuses, HTML data including links to one or more of said distributing data, to said requesting data distributing apparatus as said index data, and in response to the request from said data distributing apparatus including a specification for the link to one of said distributing data, transmits said distributing data with its link specified to said requesting data distributing apparatus.

10. The apparatus of claim 9, further wherein said processing device is operative to: (i) request one of said data servers to transmit said HTML data, (ii) receive said HTML data transmitted in response to the request, (iii) specify the link to desired one of said distributing data included in said received HTML data, (iv) request said data server transmitting said HTML data to transmit said desired distributing data, and (v) receive said desired distributing data transmitted in response to the request.

11. The apparatus of claim 10, wherein said distributing data is position data indicative of a position of a predetermined place.

12. The apparatus of claim 11, wherein each of said data servers transmits HTML data including links to one or more of said position data, and in response to a request including a specification for the link to one of said position data, transmits said position data with the link specified.

13. The apparatus of claim 12, further wherein said processing device is operative to: (i) specify the link to desired one of said position data included in said HTML data in order to request said desired position data to be transmitted, (ii) receive said desired position data transmitted in response to the request, (iii) generate mail including said received distributing data, and (iv) distribute said generated mail.

14. Apparatus for displaying position data received from one of one or more data servers via one of one or more service nodes, the apparatus comprising:
   at least one processing device operative to: (i) receive mail generated and transmitted by one of the service nodes, the mail including position data received in response to a request by the service node to one of the data servers to transmit HTML data that can be distributed to other nodes and that includes links to one or more of said position data, and (ii) display said position data in the received mail, the position data indicative of a predetermined place.

15. The apparatus of claim 14, wherein. said position data includes latitude and longitude data indicating the latitude and longitude of a place corresponding to said position data.

16. The apparatus of claim 15, further wherein the processing device is operative to display the place indicated by said latitude and longitude data included in said received mail so that the place is associated with map data.

17. The apparatus of claim 16, wherein said map data includes road data indicating roads.

18. The apparatus of claim 17, further wherein the processing device is operative to: (i) measure the position of the position displaying apparatus, and (ii) based on the measured position of the position displaying apparatus and road data, display a road path joining the position of the position displaying apparatus and the place indicated by said latitude and longitude.

19. A method for distributing data, the method comprising the steps of:
   providing one or more data servers, service nodes, and client nodes coupled by at least one communication network, each of said data servers responsive to a request from one of said service nodes for transmitting to said requesting service node index data indicative of distributing data that can be distributed to other nodes and said distributing data; and each of said service nodes operative to:
request one of said data servers to transmit said index data and said distributing data;
receive said index data and distributing data transmitted in response to the request for transmission;
generate mail including said received distributing data; and
distribute said generated mail to one or more of said client nodes.

20. An article of manufacture for distributing data obtained from one of one or more data servers to one or more client nodes, comprising a recording medium containing one or more programs which when executed implement the steps of:

requesting one of said data servers to transmit index data indicative of distributing data that can be distributed to other nodes and said distributing data indicated by said index data;

receiving said index data and said distributing data transmitted in response to the request for transmission;

generating mail including said received distributing data; and distributing said generated mail to one or more of said client nodes.

21. An article of manufacture for displaying position data received from one of one or more data servers via one of one or more service nodes, comprising a recording medium containing one or more programs which when executed implement the steps of:

receiving mail generated and transmitted by one of the service nodes, the mail including position data received in response to a request by the service node to one of the data servers to transmit HTML data that can be distributed to other nodes and that includes links to one or more of said position data, and displaying said position data in the received mail, the position data indicative of a predetermined place.

* * * * *